Sept. 14, 1926.
S. L. GADBURY
1,599,814
DIRECTION SIGNAL FOR MOTOR VEHICLES
Filed July 10, 1924
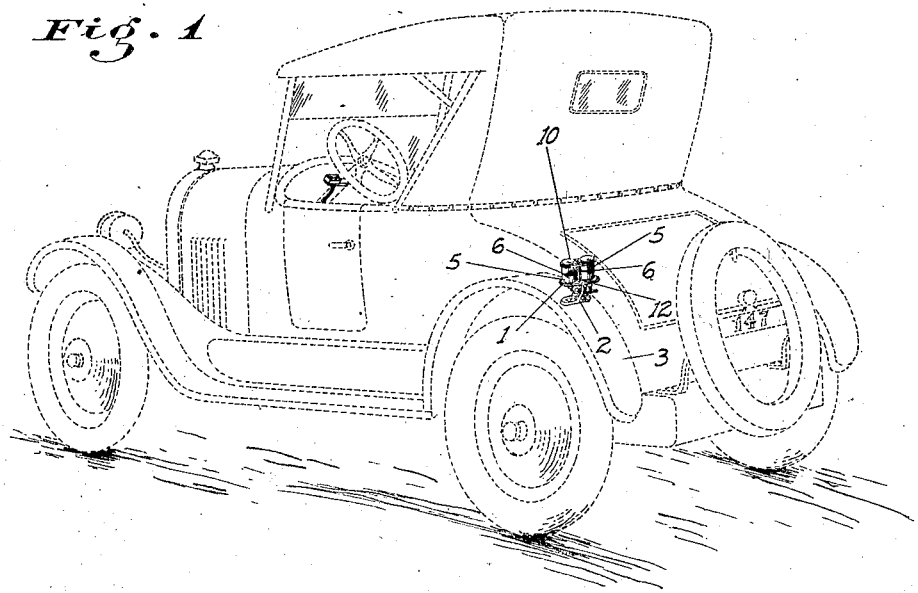
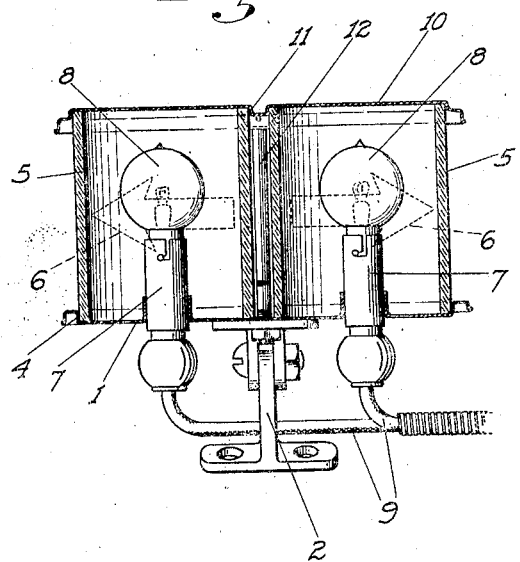
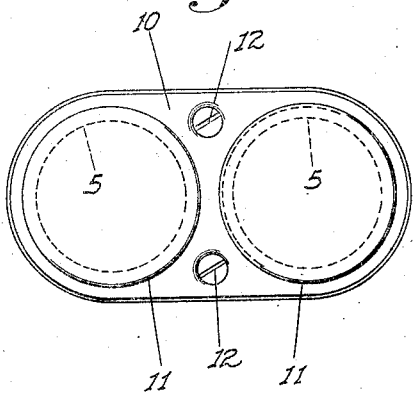
INVENTOR
Samuel L. Gadbury
ATTORNEY Patented Sept. 14, 1926.

1,599,814

UNITED STATES PATENT OFFICE.

SAMUEL L. GADBURY, OF STOCKTON, CALIFORNIA.

DIRECTION SIGNAL FOR MOTOR VEHICLES.

Application filed July 10, 1924. Serial No. 725,159.

This invention relates to improvements in devices to be mounted on motor-vehicles, by means of which right or left direction signals may be given by the driver without having to extend the hand.

The principal objects of my invention are to provide a device for the purpose so constructed that the necessary signals may be given without the use of any moving parts and yet in an unmistakable manner, and to arrange the signal-giving members in such a way that when mounted on the vehicle in the proper location, either signal when given is visible from the sides of the vehicle as well as to the rear thereof.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 1 is a perspective outline of an automobile, showing my improved signal device mounted thereon.

Fig. 2 is a sectional view of the same detached, and

Fig. 3 is a top plan view of the device.

Referring now more particularly to the characters of reference on the drawings, the numeral 1 denotes a horizontal metal plate of oblong form, with its major axis extending transversely of the vehicle on which it is mounted.

On the under side of this plate is secured a bracket device 2 of suitable character, which is itself adapted to be secured on the vehicle, preferably on the rear left-hand fender 3 thereof.

The plate 1 is provided with shallow circular cups 4, disposed in spaced relation lengthwise of the plate or transversely of the vehicle.

The plate supports glass cylinders 5 of suitable height and diameter, the lower ends of which are seated in the cups which thereby prevent misalinement of the cylinders.

The left hand cup is preferably colored red, and the right hand one blue, or any other suitable distinctive color combination may be used.

Relatively opaque direction indicating pointers such as arrows 6 are provided on the cylinders, and extend part way around the same from the rear faces thereof. These arrows or the like are of course horizontally disposed, the one on the left hand or red cylinder pointing to the left, and the one on the other cylinder pointing to the right.

Socket fixtures 7 for independent electric light bulbs 8 are mounted on and project upwardly from the plate 1 centrally of the cylinders, the independent leads 9 from said lights being attached to any suitable form of switch means (not shown) positioned within convenient reach of the driver.

A metal cover plate 10, practically a duplicate of the base plate 1, extends across the tops of the cylinders, and is cupped as at 11 to seat the upper ends of said cylinders.

Screws 12 extend between the plates to clamp them and the cylinders together, these screws being disposed between the cylinders, and of course outside the same.

As shown in Fig. 2, the lower end of the screws pass through the central bracket, which thus provides a rigid and inflexible surface against which to set up the nuts of the screws or bolts.

The signal device is preferably mounted if possible so as to be visible from both sides of the car, as well as from front and back. In any event, it would be always visible from three directions when either light is lit, owing to the employment of the cylinders which are translucent all around. The colors of the two being distinct from each other any signal given is emphasized. Also, although one cylinder more or less hides the other in a transverse plane, the translucency of the cylinders, and their shape, enables the glow from either one to be readily visible from beyond the other and intervening cylinder.

The base and cover plates are opaque so as to concentrate the light and cause it to show more as a horizontal beam.

By merely removing the screws 12, the parts may be disassembled for replacement of lights, cleaning, etc., without detaching the base plate from the vehicle.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A signal device for motor vehicles including a horizontal base plate, bracket means disposed centrally thereunder for attachment to the vehicle, vertical and translucent tubular members supported on the plate in transversely spaced order, light supporting elements mounted on the base plate and projecting into the tubular members, a common cover plate for both members, and screws extending downwardly from the cover plate to and through the base plate and bracket thereunder, said screws being located intermediate the tubular members.

In testimony whereof I affix my signature.

SAMUEL L. GADBURY.